March 18, 1947.  L. P. KELLY  2,417,503
APPARATUS FOR NESTING PIPE ELBOWS
Filed April 29, 1944  7 Sheets-Sheet 1
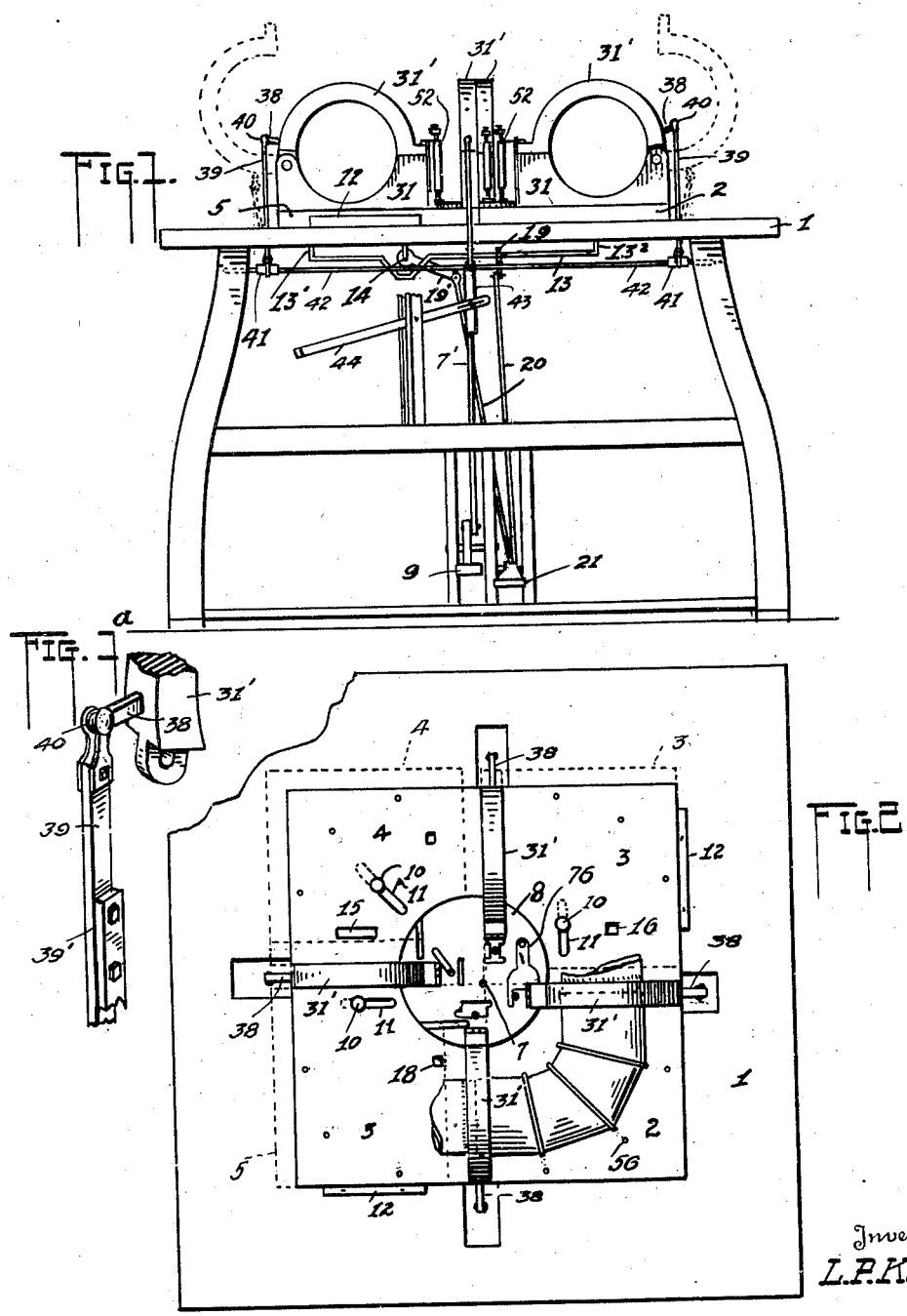

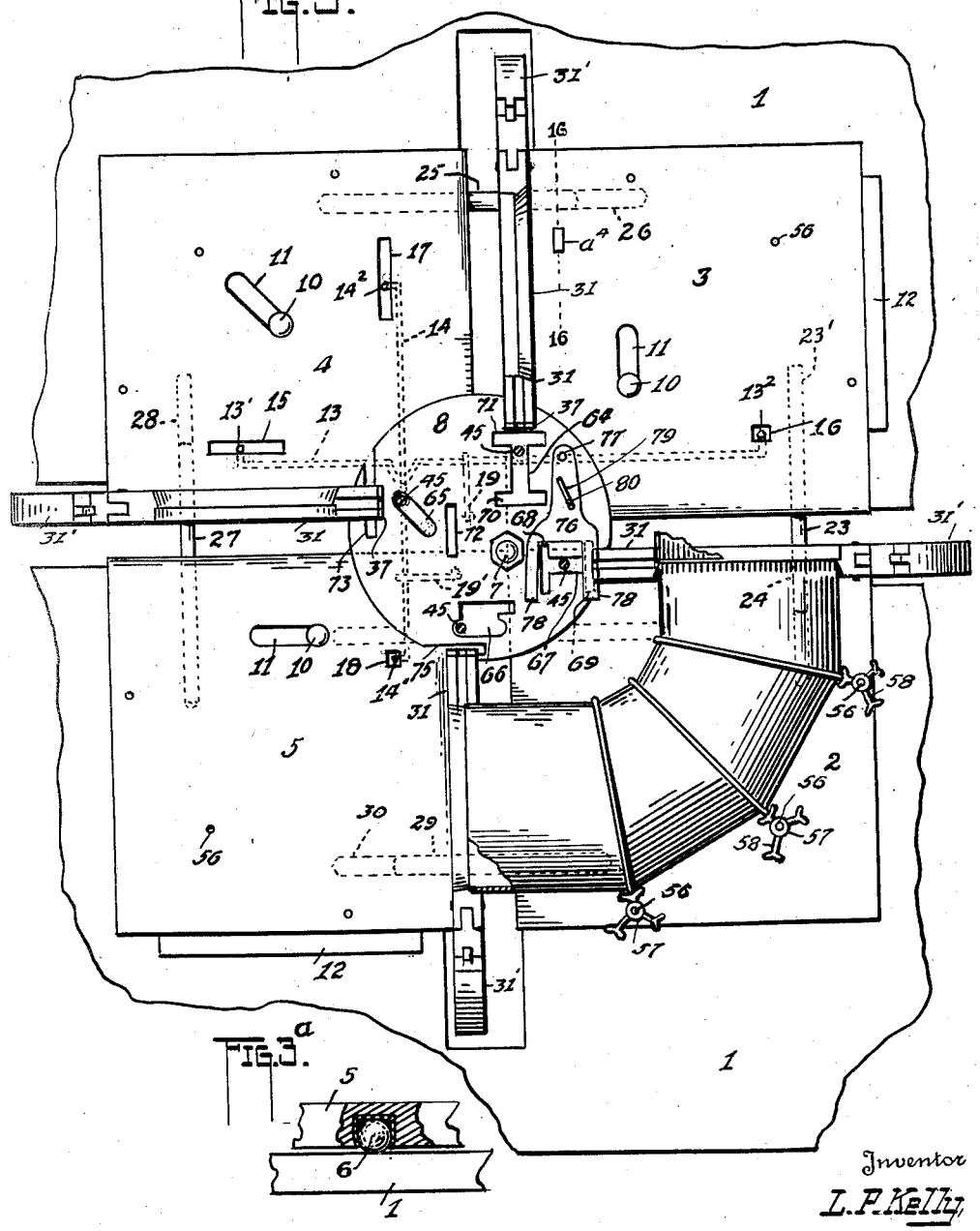

March 18, 1947.  L. P. KELLY  2,417,503
APPARATUS FOR NESTING PIPE ELBOWS
Filed April 29, 1944  7 Sheets-Sheet 3
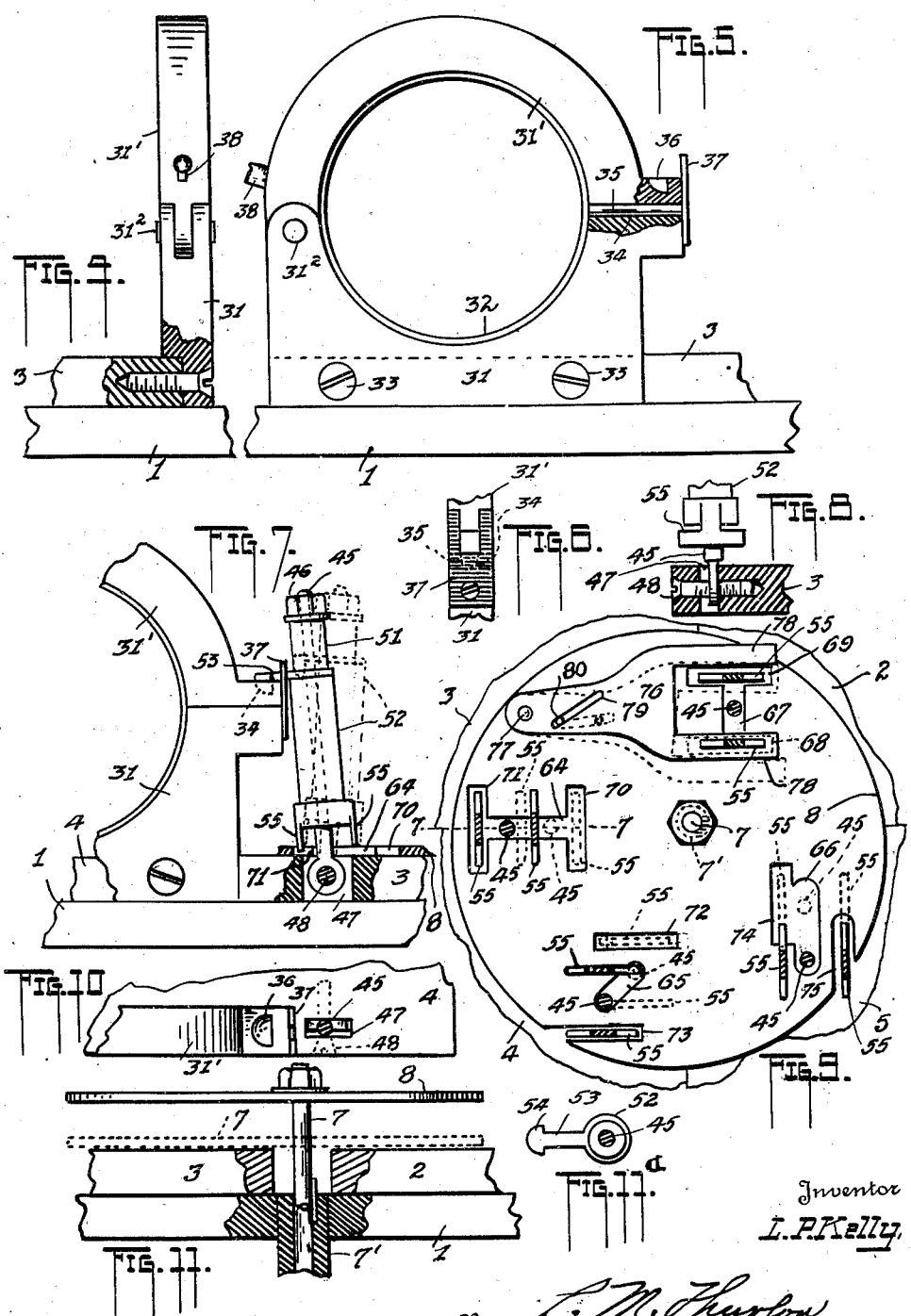
Inventor
L. P. Kelly,
By L. M. Thurlow
Attorney March 18, 1947. L. P. KELLY 2,417,503
APPARATUS FOR NESTING PIPE ELBOWS
Filed April 29, 1944 7 Sheets-Sheet 4
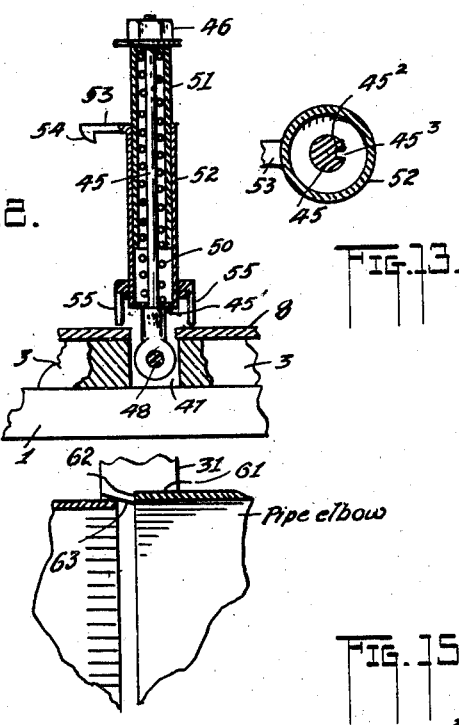
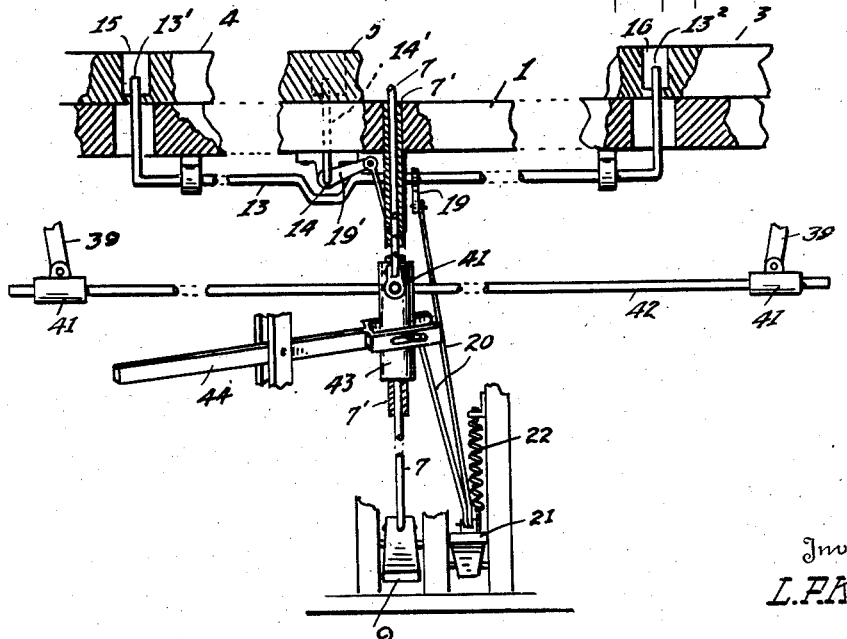
Inventor
L. P. Kelly,
By L. M. Thurlow
Attorney March 18, 1947.   L. P. KELLY   2,417,503
APPARATUS FOR NESTING PIPE ELBOWS
Filed April 29, 1944   7 Sheets-Sheet 5
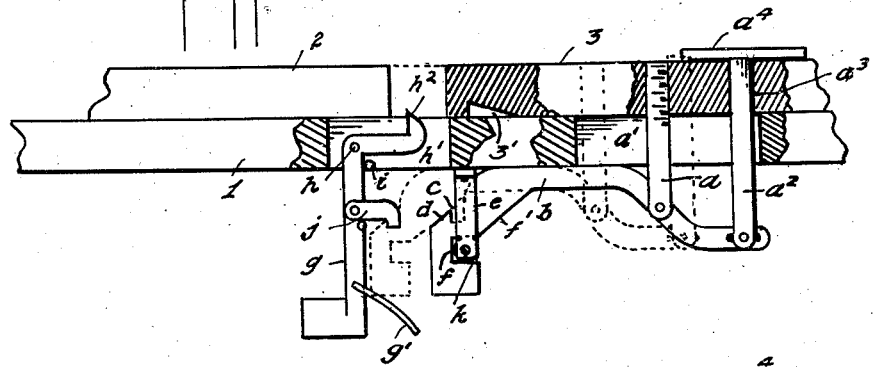
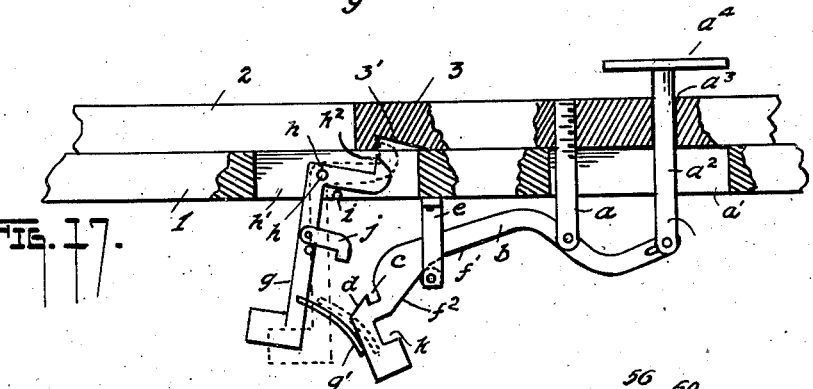
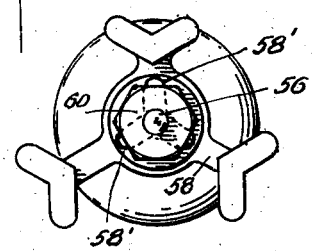
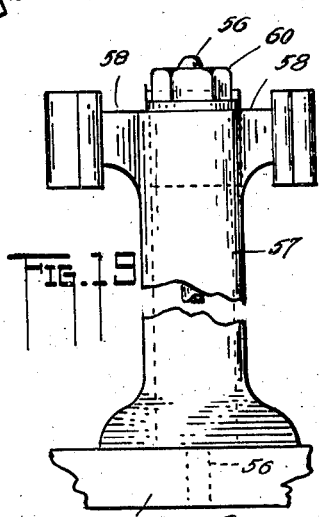

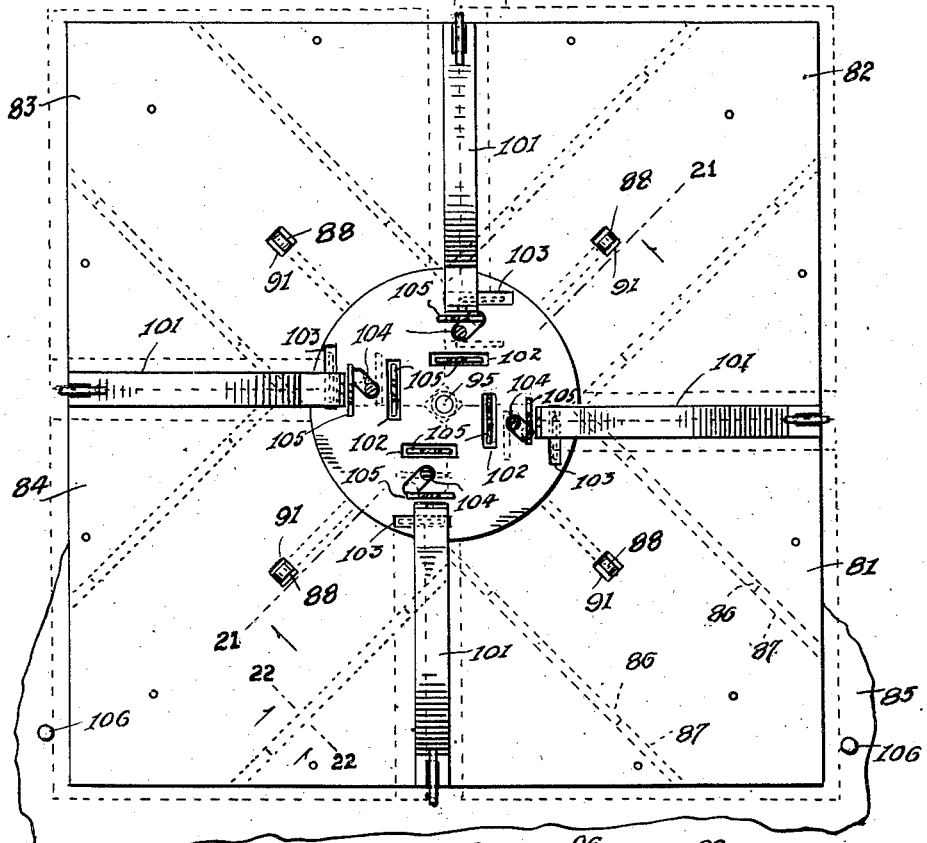

March 18, 1947.  L. P. KELLY  2,417,503
APPARATUS FOR NESTING PIPE ELBOWS
Filed April 29, 1944   7 Sheets-Sheet 7
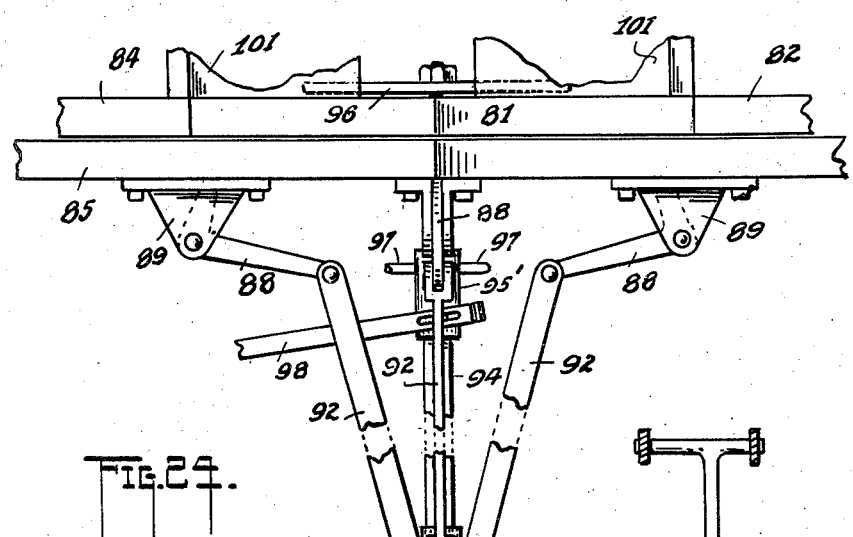
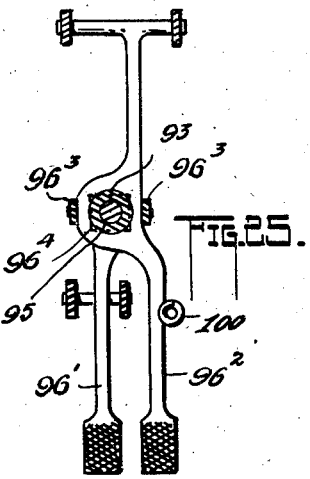
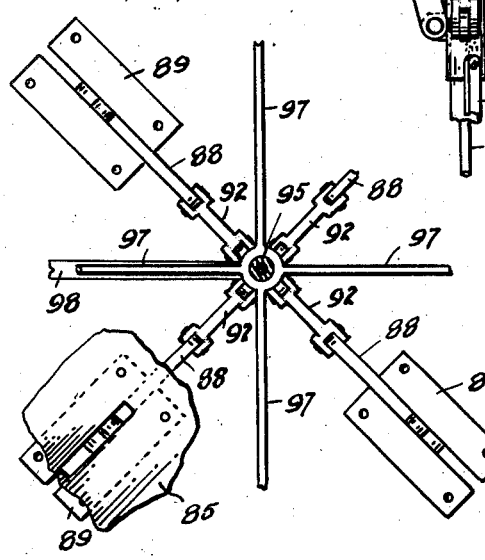
Inventor
L. P. Kelly
By L. M. Thurlow
Attorney Patented Mar. 18, 1947

2,417,503

UNITED STATES PATENT OFFICE 2,417,503

APPARATUS FOR NESTING PIPE ELBOWS

Lewis P. Kelly, Peoria Heights, Ill.

Application April 29, 1944, Serial No. 533,442

27 Claims. (Cl. 100—31)

This invention relates to a machine for nesting stove, furnace, and conductor pipe elbows.

The main object of the invention is to provide mechanism wherein to so place four pipe elbows as to present all of their ends for entrance one into the other, and finally by pressure nest them in the usual "doughnut" form ready for shipment and storage.

Another object is to provide in a machine for the above purpose a series of clamps for holding both the crimped male and the uncrimped or female ends of a series of four elbows inserted for manipulation in said machine, said clamps serving to impart a perfect "rounding" of said ends to be guided toward each other and to be nested together all in one operation of said machine.

As is known, in order to best store or ship pipe elbows it is customary to laboriously by hand nest them one by one at the expense of much time, some of the units in so doing often being rendered useless due to the force used, and rough handling. Due to these disadvantages I have devised an apparatus by which to do the same work, to the end that there shall be no wastage and to save much time and labor.

To the end that the invention may be thoroughly understood, the accompanying drawings are provided wherein:

Figure 1 is a front elevation of the apparatus;

Figure 1ª shows a ball joint in perspective as part of the structure used;

Figure 2 is a plan of the apparatus, parts being shown in section;

Figure 3 is a plan of the machine much enlarged, as compared with Figure 2, certain parts also being shown in section;

Figure 3ª is an elevation of part of a bench top or bed with a slide above it showing a ball bearing support for the latter;

Figure 4 is an end elevation, much enlarged, of a clamp and part of a slide carrying it, both shown in part section;

Figure 5 is a side elevation, in part section, and much enlarged, of what is shown in Figure 4;

Figure 6 is a detail of parts of the jaws of the clamp of Figure 5 as they would appear in viewing the latter figure from the right of said figure.

Figure 7 is a side elevation of part of the clamp, and part of a slide on which it is mounted, together with a latching device supported on the latter;

Figure 8 is a detail in section of part of the slide of Figure 7 showing the means of mounting the latching device of Figure 7, as seen from the right of that figure.

Figure 9 is a plan of a plate shown in Figure 3, much enlarged, together with a part shiftable over the same and other parts as well, shown in section;

Figure 10 is a plan of part of a clamp shown in some of the previous figures, together with the slide carrying it, illustrating the manner of providing a part of the latching device on said slide as agreeing with Figure 8, though in part section;

Figure 11 is an elevation in part section of a slide and a plate shown in Figures 3, 7 and 9 and its relation of the plate to the slide as compared with said Figure 7;

Figure 11ª is a plan of part of the latching device of Figure 7;

Figure 12 is an elevation in section of the latching device shown in Figure 7;

Figure 13 is a transverse section in plan, much enlarged, of an erected pivot pin and latch barrel shown in Figure 12;

Figure 14 is a plan of part of a jaw of an elbow clamp together with the ends of parts of two elbows in position thereat;

Figure 15 is a front elevation of part of the machine showing certain operating foot levers and other parts for operating the various members illustrated in the preceding figures;

Figures 16 and 17 are elevations in part section of the table top, or bed, of the apparatus together with a slide thereon and certain mechanism for controlling the latter, as produced on lines 16—16 of Figure 3;

Figures 18 and 19 are, respectively, a plan and an elevation of a rotatable pipe elbow gauge;

Figure 20 is a plan of a modified form of part of the apparatus of the preceding figures;

Figure 21 is an elevation in part section of parts shown in Figure 20 taken on line 21—21 of that figure;

Figure 22 is an elevation of parts in section taken on line 22—22 of said Figure 20;

Figure 23 is an elevation of the apparatus of Figure 20 showing the operating mechanism therefor;

Figure 24 is a plan in part section of certain parts shown in Figure 23, and

Figure 25 is a plan of a foot lever structure for association with the structure of said Figure 23.

I have shown herein and will describe two forms of my machine and details therof, but it it understood that other structures may be used, and as is contemplated, without sacrificing the intent of the invention, and as lying within the meaning of the claims to follow.

In Figure 1 is illustrated a bench upon whose top, bed, or other support 1 is mounted a series of four members 2, 3, 4 and 5, which may be of any form as to outline, being square in this instance only. These members are adapted to substantially abut each other and form a square four times the area of any one of them. In this form of apparatus one of these members, 2 is fixed in position on the bed 1, while the others 3, 4 and 5 are adapted to be shifted away from the said member 2, and away from each other from a central position at the inner corner of said member 2. The members 3, 4 and 5 will be generally referred to herein as "slides" to more readily identify them, and, these are preferably supported on ball bearings 6, but one of which is shown, see in Figure 3ᵃ. The bed 1 has a smooth upper surface, by preference, the balls rolling upon the same while being confined in the slides in any desired manner, or substantially as shown, it being understood that the top surfaces of all of the parts 2, 3, 4, 5 are flush with each other. In Figures 2, 3 and 11, particularly, is an upright rod 7 which is shiftable vertically through the bed 1 through a guide tube 7' and projects above the same at a central position where all of the slides 3, 4 and 5 would meet at the inner said corner of the member 2. In the drawing the material at the adjacent corners of all the three slides and that of the member 2 are cut away, see dotted lines in Figure 3, leaving a central space adjacent said rod 7, the center of the latter coinciding with the point where the inner corner of the member 2 would be found. The said rod carries a plate 8 which in one of its positions will lie close to top surface of the slides and said member 2, and parallel therewith. This plate, however, will be described later herein as to its form and purpose, though it may be stated that it is to be lifted from the slides 3, 4, 5 and member 2 at times by a foot lever 9 to be described in connection with Figure 15.

Referring to Figure 3, particularly, it will be noted that all of the slides 3, 4, 5 lie spaced from the member 2, and from each other as one of their positions, it being further noted that the slides 3 and 5, as viewed, shift in directions at right angles to each other, while the slide 4 has movement away from both 3 and 5 in a diagonal direction. Means to shift these in unison will be described presently. Pins 10 uprising from and secured in bed 1 serve to guide the slides, each of the latter having a slot 11 through which said pin extends, while members 12, at each slide 3, 5 serve as aids in their guidance.

The means for shifting the slides is indicated in Figure 3 in dotted lines, and in Figure 15, the slides being spread apart in this figure, as stated. In these figures two rock shafts 13 and 14 are suitably journaled beneath the bed 1, their axes lying in the same plane. Each shaft has at each of its ends an upturned arm 13', 13²' and 14', 14² respectively. One arm 13' engages in a slot 15 of the slide 4, its mate 13² engaging in a hole 16 of the slide 3. An arm 14² lies in a slot 17 of said slide 4, its mate 14' extending into a hole 18 in the slide 5, it being observed that the slots 15 and 17 lie at right angles to each other in the slide 4 and that since the upturned arm 13² and an arm 14² are carried by different shafts the rocking of both the latter in the proper direction will jointly impart the "diagonal" line of movement to said slide 4 toward both slides 3, 5 and toward the fixed member 2.

At the same time the other upturned ends 13', 14' of the two shafts 13, 14 respectively will impart movement to the slides 3 and 5 toward said member 2 all to the end that the slides and said member 2 will lie in abutting relation, see Figure 2.

Each shaft 13, 14 has a lever 19, 19' respectively, connected by rods 20 to a foot lever 21, Figure 15. A spring 22 suitably held, and attached to said lever, serves to maintain the latter in normally raised position at which time the several slides 3, 4, 5 would lie in their separated outer or spread positions shown in Figure 3.

In addition to the guide pins 10 other guiding means is employed which serve to stabilize the slides in their action. This means may consist of a pin 23 fixed in a socket 23' in the slide 3, said pin being slidable in a socket 24 of the fixed member 2.

Likewise similar pins 25 extend from the slide 4 into sockets 26 in the said slide 3. Again, pins 27 carried by slide 5 extend into sockets 28 of the slide 4, and finally pins 29 enter sockets 30 of slide 5. Thus the several slides are evenly and smoothly governed in their movements.

In Figures 16 and 17 is shown a structure, in two positions, taken on line 16—16 Figure 3, by which the slides 3, 4, 5 are all held temporarily in their closed positions abutting each other, and abutting the member 2, this being their position shown in Figure 2 as stated. It is first to be remembered that the spring 22 at the foot lever 21, Figure 15, holds the slides in open or spread position, Figure 3.

When the said lever is depressed to move the slides to their inner or opposite positions, in order to operate upon work placed in the machine, means such as a latching arrangement is provided for holding said slides at the named inner position in opposition to the spring 22 at the lever 21. In said Figures 16, 17, reference character $a$ is a hanger fixed to and depending from the slide 3 through a slot $a'$ in the bed 1. On this hanger is pivoted a latch-lever $b$, one end having pivotal connection with a pin $a^2$ of the said slide 3 and carrying above the latter a cross head $a^4$, for example. The other or longer end of the lever is provided with a notch $c$ in its top edge, and adjacent the notch said edge has a downward angling face or edge $d$. Depending from and attached to the bed 1 is a stirrup $e$ carrying a roller $f$ upon which a lower angled edge $f'$ of the lever may move in shifting movement together with the latter, said lever, having a cam surface $f^2$ at its under edge by means of which, it may be raised in being drawn over the roller when the slide 3 is shifted to open position. Adjacent and below the cam surface $f'$ is a notch $k$ to receive the said roller wherein the latter rests when said slide is in the position in Figure 16, the lever thus being held in the position shown in that figure.

Pivotally hung at $h$ within a slot $h'$ of the bed 1 is a lever $g$ having two arms at right angles to each other, the pivot $h$ being at the junction of the two said arms. One arm has an upper projection $h^2$ which extends above the bed's upper surface, while in the under surface of the slide 3 is a notch 3' complementary to the projection $h^2$ to receive the same. A stop $i$ on the bed limits the movement of the lever $g$, the latter carrying a pawl or detent $j$ adapted to engage the named notch $c$ of the lever $b$ by sliding upon the angled surface $d$. On the lower or depending arm of the lever $g$ is a member $g'$ downwardly inclined toward the lever $b$. When the slide 3 is spaced from the fixed member 2 as in Figure 16, said slide and its companions, together with the said member 2, may receive the work to be operated upon, the lever $b$ having the position in Figure 16 may be held by the roller $f$ as explained.

The elbows to be nested are each placed on a slide, one of them lying upon the cross-head $a^4$ which, of course is already depressed as in Figure 16. When the slides approach each other to their inner closed position by foot lever 21 the slide 3 is shifted toward and against the fixed member 2, the latch or pawl $j$ engaging in the notch $c$. The said foot lever 21 may return to its normal raised position due to the spring 22 but the said pawl or detent holds the closed abutting position of the slide 3 as shown in Figure 17. When the elbow is lifted from the machine at the said closed position of the slide 3 the lever $b$ will fall away from and release the pawl or detent $j$. In falling the said lever strikes the member $g'$ of the lever $g$ holds it and its pawl away from the path of travel of the lever $b$. The projection $h^2$ has thus been lowered to release the slide 3 whereupon the spring 22 will shift the companion slides to their open positions. At this time, of course, the movement of the slide 3 has raised the lever $b$ from the position in Figure 17 and, due to the roller $f$, has been lifted to the initial position in Figure 16, completing the cycle or operations, and ready to repeat the same. This entire structure is, of course, but one way of holding the slides at their innermost or central position when they abut.

Having described the manner of operating and controlling the slides the means for operation upon the pipe elbows may now receive attention. That is to say, clamps are provided for firmly encircling the uncrimped female ends of the elbows and serve to shape them into perfect circular form for receiving the crimped or male ends. One of the clamps, made up of two jaws, is shown in Figures 4 and 5 respectively. The lower jaw 31 has a semi-circular depressed seat 32 in its top for receiving one end of each of two elbows, each one of the slides 3, 4, 5, at one edge thereof, being provided with these two jaws, the fixed member 2 being also thus provided. Attention is directed, now, to the fact that each said lower jaw is located upon each of the elements 2, 3, 4, 5 at those edges thereof that are to be moved toward each other. Further, that each lies at the right-hand edge of each element, i. e., slides 3, 4, 5 and the fixed member 2, as would be seen by an observer in moving around the apparatus in a clockwise direction or as viewed in the drawings.

Preferably, the described lower jaws are separable from their supports, 2, 3, 4, 5, being held in place by screws 33, as an example, in order that jaws of larger or smaller capacity if desired, may be substituted when required for pipe-elbows of different diameters.

Surmounting each jaw 31 is an arched upper jaw 31' pivoted at its rear at 31² on the former, said pivot being lower, by preference, than the front abutting portions of the jaws. As in Figure 6 one of the abutting portions of the jaws at said forward side is provided with a groove 34 while the other has a rib 35 to seat therein, this structure of the portions serving to assist in preventing lateral movements of the two jaws relatively. In addition, the named portion of the upper jaw has a socket 36, and the lower jaw has an upstanding forked plate 37 affixed thereto, Figure 6.

The upper jaws 31' of the several clamps are capable of being raised simultaneously to positions shown by broken lines in Figure 1 and that this may be done an arm 38 projects rearwardly from each said jaw and a rod 39 is attached thereto by a well known ball and socket arrangement, 40 for example, shown in Figure 1ᵃ. Pivoted to the other ends of each of the rods 39 is a sleeve 41 which may rock upon one of four arms 42 beneath the bed 1 and radiating from a sleeve 43, for instance, which is slidable upon the tube 7' that guides the rod 7, and is raised and lowered by a hand lever 44, Figure 15, by which the jaws 31' may be opened or closed. The rods 39 are preferably adjustable for length as indicated in said Figure 1ᵃ at 39'.

Attention is now directed especially to Figure 3, and to Figures 7 to 12 which show a latch structure. Erected on each of the slides 3, 4, 5 and fixed member 2 directly forward of each of the clamps 31, 31', Figures 2 and 3, is a stem 45 threaded at its upper end to receive a nut 46, the lower end of the stem extending through a slot 47, adjacent the edge of slides 3, 4, 5 and member 2, and there held by a screw 48, for example, though free to swing in a plane paralleling the clamp to which each of said stems is adjacent. Encircling the stem is a coil spring 50 and enclosing the spring is a tube 51 whose upper end may be closed if desired except for an opening to admit the said stem 45. Encircling the tube 51 and slidable vertically upon the same is barrel 52, the latter having an end wall resting upon a shoulder 45' of the stem and prevented from rotating about the stem by a groove 45² in the latter, and a lug extension 45³ as part of the said end wall of the said barrel, the spring being compressed between the barrel wall and the upper end of said tube 51, all as an example only, of the structure that may be used. Said barrel 52 carries at its upper end an extended finger 53 provided with a depending lip 54, answering as a latch, Figure 12, the finger in one of the positions of the swing of the barrel and stem adapted to enter and seat in the socket 36 of the upper clamp jaw 31', while lying in the forked plate 37, said finger permanently extending toward or in the direction of the clamp in any position of tilt or swing thereof. Depending from the lower end of the barrel 52 and fixed with respect thereto are two parallel feet 55 each equally spaced from the axis of the stem 45, these feet lying at right angles to the plane of the adjacent clamp structure.

The stem is so located, as to its pivot at 48, that it may swing toward or away from the clamp 31, 31' a limited distance as indicated in Figure 7, being thus limited in its extreme swinging movement away from the clamp, when free of the socket, as by striking of the walls of said slot 47 from which it rises.

Both feet are equidistant from and lie clear of the upper surface of the plate 8, through which the stem extends, when said stem 45 is in a vertical position.

In Figure 3 a pipe elbow is shown in position on the fixed member 2 to be operated upon, and it may be understood that each of the slides 3, 4 and 5 will likewise carry an elbow, but not herein shown. In said figure the upper jaws 31' of the clamp are raised to admit of placing the elbows in position. Since these upper jaws are thus out of the way the elbows may be readily placed and they so lie that their ends may rest partially within and upon any two of the lower jaws 31, this being illustrated in part at the right of said Figure 3. The crimped smaller or male end lies in position at the right while the female end lies at the left. When thus placed the jaws when closed secure the elbows firmly in position. Preferably, means is provided as abutting media for each elbow though the male end is shiftable therein. A series of three abutments are employed, in the present instance only. The structure of one of the latter being illustrated in Figures 18 and 19. A stud 56 is secured in all of the slides and the fixed member 2, at the outer corner of each, at three spaced positions corresponding to the spacing of the usual joining beads of the elbow, see Figure 3. The stud receives upon it a body 57 to rest upon the top of a slide, or the member 2, as may be, said body having three radiating arms 58 each of a different length and each terminating in a pair of spread wings creating a notch or groove to receive into it a bead of the elbow. A radial slot 58' may also be provided in line with each arm 58 to allow for adjustment to and from the elbow bead. The varying arm-lengths provide for elbows of different sizes as will be understood, and a nut 60 on the stud 56 serves to fix the body 57 in position in any adjustment thereof.

In respect, now, to the relation of the elbow-ends and the jaws 31, 31', a study of Figure 14 will indicate the manner of guiding one end of an elbow into the companion end of another. Naturally, the clamping surfaces of the jaws are cylindrically curved, as intimated. Created substantially midway into jaws 31, 31' is a recess 61 leaving a shoulder 62 which receives the large or female end of an elbow in abutment therewith. At the other side of the jaws is a conical bore 63 whose smallest diameter opens into the recess 61 at the shoulder 62 and central of said recess. As clearly appears, the crimped male elbow-end in entering the conical bore will be forced into a perfectly circular form so that it will pass smoothly into the pipe end lying in the recess 61, and in action the slides in their full movement will cause full seating of said ends as will be understood in the description of the operation to follow.

Consider, now, Figures 3, 7, and 9 with respect to the plate 8 on the vertical rod 7, noting, however, that the latter figure has been rotated 90° contra-clockwise in respect to said Figures 2, 3, this having been done to assist in a better understanding of Figure 7, the latter being taken on line 7—7 of said Figure 9.

In Figure 3 the several previously named stems 45 have their places on the slides, and on the fixed member 2, as explained, those on the slides 3, 4, 5 extending through slots 64, 65 and 66, respectively, of the plate 8 while the stem at the fixed member extends through a slot 67 which, however may be merely a hole, if desired. All of said slots, as to the slides 3, 4, 5, lie in lines paralleling the directions of movement, individually of said slides. In addition to these slots is a pair of spaced parallel slots 68, 69 adjacent the stem 45 at the member 2, one at each side of the said stem and both placed at right angles to the plane of the clamp 31, 31' of said member 2. Again, in that portion of the plate 8 above the slide 3 is a similar pair of parallel slots 70, 71 also at right angles to the clamp of that slide. In the plate, also, above the slide 4 is a pair of similar slots 72, 73, lying at right angles to the clamp of that slide and these are staggered in relation to each other.

Lastly, in the plate above the slide 5 is a pair of slots 74, 75 again at right angles to the plane of the clamp thereof and staggered in the same manner as are the slots 72, 73, all for the purpose now to be made known. That is to say, without respect to position of the slides as to their two extreme limits of travel to and from a central position, the means at the stems 45 are to be operated. When the slides are in closed position the clamps 31, 31' are to be opened to release the elbows held by the latter. Contrariwise, in the spread or outer positions of the slides the clamps must be engaged and held to clamp the elbows. In either event, the plate 8 must be lifted to effect those actions. In thus lifting the plate one or the other of the feet 55 carried by the barrel 52 of the stem structure must receive abutment of the plate in order to tilt the named structure in a required direction. In viewing Figures 7 and 9, for example, it will be noticed that a foot 55, Figure 9, lies astride the slot 64 which is the slot over the slide 3. The plate 8 in rising, due to pressure on the foot lever 9 would tip the stem structure to the left, Figure 7, and lift the barrel 52 to carry the finger 53 thereof over and upon the extension of the upper jaw 31' adjacent thereto to hold that member upon the lower jaw where it is held by spring tension of the said stem structure, the elbows having been placed between said jaws. At the time this tilting action takes place the slot 69 of the fixed member 2, and the slots 70, 72 and 74 of the slides 3, 4, and 5, respectively, or those farthest from the center of the plate have, due to their positions, permitted the feet 55 lying nearest the jaws to pass into or through them without interference, thus permitting the named direction of tilting of all structures, except the structure of the fixed member 2, which will be explained later.

It is understood that all of the stem structures operate in like manner since the engaging relation of the plate and the corresponding foot of each structure is alike brought about. This entire action occurs when the slides are in their outermost positions and after the elbows are in place to be nested.

When the foot lever 9 controlling the plate is released after lifting the said plate the latter falls to its normal position. An opposite foot 55 of each of the stem structures is in position now to receive abutment of the plate in its next lifting movement and to receive pressure therefrom. When the slides are moved to the innermost position by depressing the foot lever 21 the feet 55, due to the shifting of the slides with respect to the plate 8 and the slots, and therefore the feet that serve to tilt the stem structure, overhang the slots 68, 70, 72 and 74 to permit the last named foot of each stem structure to enter and permit tilting of the latter in an opposite direction or away from the jaws 31, 31' in a rising movement of the plate 8 due to lever 9. The feet nearest the jaws in this event would lift the barrel and fingers 53 to release the jaws 31' followed by tilting the stem structures toward the center of the plate the said jaws now being free. It is thus clear that the several pairs of slots in the plate have positions in the latter to, at either limit of slide travel, permit functioning of the stem structures in the proper direction.

Now, since the member 2 is fixed, its stem structure is not shifted as are the others. That the latter may function as do the others a shifting plate 76, Figures 2, 3 and 9, is pivoted to the plate 8 at 77. This plate 76 is forked to provide spaced fingers 78 between which lies the stem 45 of the stem structure. In said plate 76 is a slot 79 which receives therethrough a pin 80 fixed in the slide 3. The slot has such a directional position with respect to the degree of shifting movement of said slide 3 that the fingers 78 will alternately cover one and expose the other of the slots 68, 69 of the plate 8, or so that the slot exposed will correspond with a slot above any slide 3, 4, 5 in like position in the plate and thereby all of the stem structures will operate in unison, either to lock or unlock the jaws 31, 31'.

Operation: With the slides 3, 4, 5 extended or spread, a pipe elbow is placed upon each slide 3, 4, 5, and upon the member 2, the clamps being open, having regard to the location of the elbow ends upon the lower jaws 31 of the open clamps, in abutting their female end upon the shoulder 62 of the latter and placing of the male end, and with their heads or ribs in abutment with the arms 58 to provide exact locations. The clamps are now closed to embrace the elbow-ends by depressing the hand lever 44. Following this the foot lever 9 is depressed to lift the plate 8, whereupon the latching stem structures are simultaneously lifted and engaged with the upper jaws 31', the springs of the stem structures serving to impart rounding to the elbow ends. Upon depressing the foot lever 21 the slides are moved to their closed or abutting positions. All the elbow ends before this latter action takes place have been lying in positions separate from each other within the jaws. As the slides approach each other, and approach jointly the member 2, all four of these members, in effect, travel in perfect timing toward a central point about which the elbows are centered. The nesting ends since being made to describe perfect circles present no difficulties as in hand operations, and the conical opening of the jaws for the crimped or male elbow-ends serve as a perfect guide and provide a positive entrance. Since the male and female ends are within the jaws of the clamp, as initially placed by hand, they begin to nest just after the beginning of slide movement so that at the end of such movement or travel to the center full nesting results.

In the described action the slides 3 and 5 move in straight lines toward the member 2 or at right angles of travel in respect to each other whereas the slide 4 moves in a diagonal line or a line lying at 45° from and between the lines of travel of slides 3 and 5.

When the elbows have been nested the foot lever 9 is operated to lift the plate 8 for releasing the clamp portions 31', followed by opening the latter by means of the hand lever. Upon removing the nested elbows the lever $b$ falls since weight has been lifted from the pin $a^2$. Thus the slide 3 is released and is free to shift, together with its mates 4, 5, to the outer or extended positions by the pull of the spring 22, the apparatus then being in position for further operations throughout the same cycle.

A modification of the apparatus and the means of shifting the slides is illustrated in Figures 20 to 25 and wherein all four of the elbow carrying members or elements are movable as contrasted to but three of such members heretofore described.

In Figure 20 four slides are illustrated 81, 82, 83 and 84, corresponding respectively, and in the same order, to 2, 3, 4 and 5 of the form of apparatus already described, while 85 is the bed corresponding to 1. The said slides may be supported on two guide members 86 affixed to the bed at spaced positions, as in said Figure 20, one of the members being shown in Figure 22. The under surface of each slide has corresponding grooves 87 to cooperate therewith and the pair of guides for each slide are placed in directions to guide all of the latter toward each other and toward a common central position.

The means serving to shift the slides to said position consists of a series of bell-crank levers 88, Figure 21, pivoted between hangers 89, for example, secured to the lower side of the said bed, the latter having slots 90 to admit one arm of each lever, that arm lying in an opening 91 in each slide 81, 82, 83 and 84. The other arms of the levers all extend in the direction of a common point, and pivotally connected with each is one end of a rod 92, all of the latter at their other ends having pivotal attachments to a sleeve 93, Figure 23.

At the named central position of the slide structures a tube 94 is suspended from the bed 85, and corresponding to 7' of the earlier figures, being secured therein and extending thereabove as in Figure 21 to form a stop, if desired, for the meeting series of the named slides, as suggested in Figure 20, in broken lines. This said tube 94 at its lower portion receives upon it the named sleeve 93, which has a snug sliding fit thereon. Within the tube is a rod 95 corresponding to 7 of the first described apparatus, and carrying at its end above the bed 85 and the named slides a plate 96, the lower end said rod having connection with a foot lever 96'. Figure 25 illustrates in plan the said lever 96' which corresponds to lever 9 before described, while above it is a lever 96² corresponding to the lever 21. Pivoted to and depending from the said sleeve 93 are a pair of links 96³ also pivoted to said lever 96², there being a recess 96⁴ in said lever through which the rod 95 extends to the lever 96' without interference. Above the sleeve 93 and shiftable on the tube 94 is a sleeve 95' and its four radiating rods 97, this collar and said rod corresponding to the same elements 43 and 42 previously described for operating the jaws 31', a lever 98 serving to shift the collar upon the said tube.

The sleeve 93 is slidable downwardly upon the tube 94 by the pull of the foot lever 96² while a spring 100, as in Figure 15, serves to lift the lever for sliding the sleeve upwardly and thereby operate the bell-crank levers and, in turn, the named slides 81, 82, 83, 84, to shift them apart and away from the named central position.

As in the form of apparatus previously described clamps 101 are employed, shown but partially in Figure 20, to serve the same end, the arms 97 serving to operate a jaw of each of them.

The arrangement is not unlike the earlier type in action and results obtained. The real difference, is the fact that all four slides are shifted in this instance and that the slots for the plate 96 are uniform in placing and spacing since all four of said slides have the same action relatively in respect to travel directions.

Referring to Figure 20 a pair of slots 102, 103 lie at the same distance from the center of the said plate 96, each pair, as intimated, lying in the same position with respect to the slides 81, 82, 83, 84 beneath them. The slots of a pair have a slightly staggered relation and thus but a slight shift of the slide is required to place a foot of the stem structure into one slot or the other, of a pair. In this instance the stem 104 only of the structure is shown as well the feet 105, since in section.

In all respects the elbow handling is identical with that previously explained.

Stops 106 on the bed may be employed at each slide, if desired, to limit the spread of the slides, the tube 94 acting in the same capacity for the inward travel limit. In the first form of apparatus, the rod 7 is to be prevented rotating within the tube 7', prevention of rotation being also true of the rod 95 in the second described form any suitable means being employed for the purpose.

I claim:

1. In an apparatus for nesting pipe-elbows, a support, a plurality of members mounted to shift thereon to and from a common point and each adapted for carrying an elbow, means to shift members of the plurality in both directions in respect to said point and in exact timing one to the other, clamping jaws on each member for clamping the female end and the male end of two separate elbows and to shape them symmetrically, and mechanism for locking said jaws together upon said ends when the members are at one limit of their travel and for releasing said jaws at the other limit of travel.

2. In an apparatus for nesting pipe-elbows, a support, a plurality of members mounted thereon and arranged around a common point adapted to when shifted approach each other in moving toward said common point and to separate when moving away therefrom, each adapted to receive thereon an elbow, a pair of jaws on each member adapted to clamp both upon the female end of an elbow and upon the male end of a companion elbow lying in said clamp in separated relation, means to impart movement to the members in perfect timing as the latter approach the said common point, mechanism to lock all of the jaws at one extreme of travel and to release said jaws when at the other extreme of travel, said jaws in their travel approaching each other and thereby forcing the elbow ends into nesting relation.

3. In an apparatus for nesting the ends of pipe-elbows, a support, a series of members mounted thereon arranged around a common point all adapted to be shifted in the same plane and approach each other, or to separate in nearing or leaving said point, respectively, each adapted to receive thereon one of four pipe-elbows in substantially a "doughnut" formation but separate from each other, a pair of jaws carried by each member, one of said jaws adapted to be opened to permit receiving within said pair companion ends of two elbows in centered relation, means to impart shifting movement to the members to move them toward said common point and in approaching each other cause the elbow ends to enter and become nested in each other, and mechanism for locking the jaws together at one of the extremes of movement of the members for holding said ends, and for releasing said jaws at the other extreme of said movement to permit release of said ends.

4. In an apparatus for nesting pipe-elbows, a support having a plane surface, a series of members mounted to shift over said surface and arranged around a common point central of said series, adapted in approaching said point to also approach each other, means to shift the members toward said point in perfect timing, each member being arranged to receive thereon at a predetermined position an elbow, a pair of jaws mounted on each member adapted to be clamped together and having a seat therein to receive and clamp upon an elbow end, one of the jaws adapted to be raised to expose the other jaw but when closed having separate seats for two nesting elbow ends by which the centers or axes of the ends are made to coincide in position, the said seats adapted to force said ends into symmetrical form for free entrance one into the other.

5. In an apparatus for nesting the ends of pipe-elbows, a series of mounted members all arranged to shift toward each other in one plane and arranged around a common point and to separate one from the other as they recede therefrom, a pair of jaws carried by each member, the same being separable to admit the nesting ends of two pipe-elbows into them, there being a cylindrically curved recess in each jaw of each pair to receive the female elbow end, and a separate smaller recess to receive the male elbow end, both recesses adapted when the jaws are closed to bring about coincidence of the axes of said ends and to bring the latter into symmetrical form, and means to move the members toward said common point to engage the elbow ends one in the other to nest the same.

6. In an apparatus for nesting the ends of pipe-elbows, a series of mounted members all arranged to shift in one plane toward a common point and to separate one from the other as they recede therefrom, means to shift the members, a pair of jaws carried by each member, the same being separable to admit the nesting ends of two elbow ends into one of them, there being a cylindrically curved recess in each jaw of each pair to receive the female elbow end, and a separate smaller recess to receive the male elbow end, both recesses adapted, when the jaws are closed, to bring about coincidence of the axes of said ends and to bring the latter into symmetrical form, the jaws adapted to approach each other when said means moves the members toward said common point to engage the elbow ends in each other and to nest the same, means to lock the jaws upon the elbow ends at said common point and mechanism to release the jaws one from the other for releasing the elbow ends nesting therein.

7. In an apparatus for nesting the ends of pipe-elbows, a series of mounted members all arranged to shift in one plane to and from a common point central of the mounting of the members and to separate one from the other as they recede therefrom, means to shift the members, a pair of jaws carried by each member, the jaws of a pair being separable to admit the unlike ends of two elbow ends into one of them, there being a cylindrically curved recess in each jaw of each pair to receive the female elbow end, and a separate smaller recess to receive the male elbow end and both recesses adapted, when the jaws are closed, to bring about coincidence of the axes of said ends and to bring the latter into symmetrical form, the pairs of jaws adapted to approach each other when said means moves the members toward said common point to engage the elbow ends in each other and to nest the same, and mechanism to lock the jaws together after the elbow ends are seated in the latter, and to release them after such nesting.

8. In an apparatus for nesting the ends of pipe-elbows, a series of mounted members all arranged to shift in one plane and arranged around a common position at the central point of the members and to separate one from the other as they recede therefrom, means to shift the members, a pair of jaws carried by each member, the same being separable to admit the unlike ends of two elbow ends into one of them, a cylindrically curved recess in each jaw of each pair to receive the female end, and a separate smaller recess contracted in diameter toward the first recess and less in diameter than such recess to receive the male end, the walls of the recesses adapted, when the jaws are closed, to bring about coincidence of the axes of said ends and to impart to said ends a symmetrical form, the jaws adapted to approach each other when said means moves the members toward said common point to engage the elbow ends in each other and to nest the same.

9. An apparatus for nesting the ends of furnace pipe elbows including in its construction, two mounted members arranged and adapted to have separate directions of travel toward each other and toward a common point in closely associated relation, a pair of jaws on one of the members jointly having a bore to receive tightly therein the female end of one elbow, and having a bore to receive the male end of another elbow, and means to impart travel to the members to move them at equally timed rates to carry the elbow ends toward each other for nesting said ends.

10. An apparatus for nesting the ends of pipe elbows including in its construction two mounted members arranged and adapted to have separate directions of travel toward each other in closely associated relation, a fixed jaw portion on one of the members, a second jaw portion pivoted with respect to the fixed jaw portion adapted to be closed upon the latter, said jaw portions jointly having a bore to receive and hold the female end of an elbow resting on said member, means on the other member to secure thereon an elbow with its male end in the bore of the jaw portions, and means to impart travel to the members to move them toward each other for forcing the male and female elbow ends into intimate engagement.

11. An apparatus for nesting the ends of furnace pipe elbows including in its construction two mounted members to be guided toward each other in close relation from separated positions of the same, a jaw fixed relative to each member, a companion jaw on each fixed jaw separable therefrom, the jaw portions jointly having bores therein, one to receive the female end, and the other to receive the male end of a separate elbow in the separated positions of the members, manually operated mechanism to lock the jaws upon the female elbow end while in the said separated position of the members, and means to impart travel to the latter to bring them together to seat the elbow ends one in the other, said mechanism adapted for release of the separable jaws after nesting of said elbow ends.

12. An apparatus for nesting furnace pipe elbows including in its construction, two mounted members arranged and adapted to have movement one toward the other in intimate relation from separated positions thereof, a pair of jaws on each member, one being fixed and the other swingable with respect to said fixed jaw, both jaws of each pair jointly having a bore in one side to receive the female end of an elbow, and at its opposite side having a smaller bore to receive the male end of another elbow, the axes of the bores being coincident, a latching structure to secure the jaws of the pairs of jaws tightly upon a named pipe end, mechanism for operating the latch structure to thus secure the said jaws, and means to shift the members toward each other to nest the pipe elbow ends one into the other, the said mechanism arranged when operated to release the separable jaws after the nesting of said elbow ends.

13. An apparatus for nesting pipe elbows including in its construction a series of mounted shiftable members arranged in the same relation to each other around a common point both in spaced relation and in close relation, members of the series adapted for shifting movement to and from each other, all said members having the same relative position at all times, means on each of the series of members to receive in seated relation separate spaced companion elbow ends to be nested, and means to shift the members each in exact timing with respect to the others to assemble all of them in the same relative positions by which to nest the companion ends of all the elbows.

14. In an apparatus for nesting the ends of pipe elbows, a series of mounted shiftable members, means for shifting the members toward each other in the same degree in exact timing, a pair of clamping jaws mounted on each member at four equally spaced positions, each pair for holding companion ends of elbows each of which elbows is mounted on one of said members in position in said jaws, mechanism for securing the jaws upon the said ends, means for operating said mechanism, said means also adapted to operate said mechanism to release the jaws from each other when the elbow ends are nested as the first said means shift the members to close relation.

15. In an apparatus for nesting the ends of pipe elbows, a series of mounted shiftable members, means for shifting the members toward each other in the same degree in perfect timing of travel, a pair of jaws on each member, each pair in equally spaced positions one to the other, means to open one of the jaws of each pair to permit seating in the other jaw of the companion ends of separate elbows, said jaws when closed arranged to hold the axes of the companion ends in coinciding positions, mechanism to tightly lock the jaws of each pair together upon the elbow ends, means to operate said mechanism, the said elbow ends being entered into each other and nested when the first named means has moved the members into close relation, said mechanism through the means for operating the same arranged to be operated to release the movable jaws.

16. In an apparatus for nesting the ends of pipe elbows, a series of mounted shiftable members, means for shifting the members toward each other in the same degree in perfect timing, a pair of jaws on each member, each pair being in equally spaced positions relatively, means to open one of the jaws of each pair simultaneously to permit seating in the other jaw of the companion ends of separate elbows, said jaws arranged to hold the axes of the companion ends in coinciding positions, mechanism to simultaneously tightly lock the jaws of each pair together upon the elbow ends, means to operate said mechanism, the said companion elbow ends being entered into each other and nested when the first named means has moved the members into close relation, said mechanism through the means for operating the same arranged to be operated to release the movable jaws.

17. In an apparatus for nesting furnace pipe elbows, a series of mounted shiftable members, means for shifting the members thereof to and from each other in unison and in exact timing, a pair of jaws on each member equally spaced from each other, each pair adapted to receive between them complementary ends of two elbows to be clamped, one of the jaws of each said pair being separable from the other, means to open and close the separate jaws simultaneously, mechanism for securing the jaws of a pair in clamping relation upon said elbow ends, said mechanism adapted to tilt to and from the jaws on a mounting for the same and including a pair of feet spaced one at each side of the place of said mounting, means for exerting pressure on one of the feet to secure the jaws at one extreme of travel and to release the separable jaws in another extreme of said travel by pressure against the other foot, all said mechanisms being simultaneously operated at both extreme positions by the last named means.

18. Apparatus for nesting furnace pipe elbows including in its construction a series of mounted members, certain of them adapted to be shifted simultaneously toward each other and also toward a central position with respect to all of them, means to shift the members in the named direction, mechanism constantly tending to shift the members in an opposite direction, releasable means to automatically secure the members relatively when at the said central position in opposition to the said mechanism, a pair of clamping jaws on each member, each pair adapted to receive therein the complementary ends of two separate elbows, and a part associated with the last named means to release the same upon removal of an elbow from the apparatus.

19. Mechanism for the purpose named including in its construction a support, a pair of members carried on the support, mechanism to move the members toward and away from a common point on said support, a pair of jaws on one of the members, one of the jaws thereof being liftable from the other and both adapted to receive and clamp upon the female end of a pipe, means to clamp the liftable jaw in pipe holding position, means for holding another pipe on the other member of said pair of members with a male end thereof directed toward the clamped female end, the axes of the two ends being coincident, said mechanism adapted, when moving the members toward said common point, to force the thus directed pipe ends into nesting engagement.

20. The invention as recited in claim 19, including means to bring about the release of said liftable jaw.

21. Mechanism for the purpose named including in its construction two pairs of jaws, each pair adapted for receiving and holding a pipe elbow end therebetween, one of the jaws of each pair being liftable from its companion, mechanism for moving one of the pairs of jaws toward the other to nest one elbow end in the other, a latch structure engaging each liftable jaw to clamp it upon the elbow end thereat, and means common to both latch structures adapted to operate each, both to cause clamping of the pairs of jaws and for releasing said liftable jaws.

22. The invention recited in claim 21, including means for raising the liftable jaws for permitting removal of the elbow ends from their seated position when nested one in the other.

23. Mechanism for the purpose named including in its construction a clamping means composed of a pair of jaws to receive and clamp the female end of a pipe therein, the jaws being separable, means to secure the jaws relatively upon the pipe end and to impart to it a symmetrical form, a structure for holding a second pipe with its male end directed toward the said female end, mechanism to move one of the pipe holding structures toward the other to nest the thus directed pipe ends, and means for operating the first named means for securing one of the jaws upon said female pipe end before the pipe ends are nested and for releasing said jaw after the nesting operation.

24. Mechanism for the purpose named including in its construction a pair of jaws adapted for clamping a pipe end therebetween, one of the jaws being pivoted with respect to the other and liftable therefrom, a latch structure adjacent the pair of jaws arranged to be moved toward and engage upon the liftable jaw and adapted to place a yielding pressure thereon, means to move the structure toward the jaws, the same adapted, also, to engage said structure and release it from said liftable jaw and to move it away therefrom.

25. Mechanism for the purpose named including in its construction a pair of jaws for clamping upon a pipe end, one of them being pivotally mounted with respect to the other and swingable with respect thereto, said jaws being mounted to shift between two positions in parallel planes, mechanism for shifting the jaws, a latch mounted at each pair of the jaws to swing toward and away from the same, said latch adapted in one position of swing, to engage upon and clamp the swingable jaw upon the pipe end held in the jaws, being held thereon elastically, and means adapted to tilt the latch to disengage it from said swingable jaw in one location of the jaws and move it away from the same, and in another position of the jaws to move the latch into jaw engagement.

26. Mechanism for the purpose named including in its construction a support, a series of pairs of jaws spaced around a common point on said support adapted to be moved to and from said point and to and from each other, one of the jaws of each pair being pivotally mounted to swing away from the companion jaw, a spring controlled latch at each pair of jaws, each adapted to swing toward and away from the jaw to which it is adjacent, and adapted to engage upon a closed swingable jaw to hold the same in clamped relation with a pipe end, and means common to all of the latches to swing them simultaneously toward and upon the swingable jaws, and also to engage said latches to disengage them from the jaws and move them away from said jaws.

27. Mechanism for the purpose named including in its construction a pair of jaws mounted and arranged to be shifted between two positions, means to shift said jaws to one of said positions for receiving and holding a pipe-end, means for automatically shifting the jaws from that position to a second position, and a mounted latch mechanism to operatively hold the jaws in the first named position and adapted to receive thereon the weight of a second pipe-end, the removal of the latter from the latch mechanism permitting the release of the latter from jaw control, and for the automatic return of the jaws to the second named position.

LEWIS P. KELLY.

REFERENCES CITED

The following references are of record in the file of this patent:

UNITED STATES PATENTS

| Number | Name | Date |
|---|---|---|
| 1,035,448 | Keyes | Aug. 13, 1912 |
| 1,065,387 | Ogg | June 24, 1913 |
| 1,537,549 | Raffay | May 12, 1925 |
| 1,246,557 | Crowder | Nov. 13, 1917 |
| 1,515,785 | McDonald | Nov. 18, 1924 |